April 7, 1953
M. W. BRAINARD
2,634,379
ROTATING RECTIFIER FOR ELECTRIC MACHINES
Filed Nov. 17, 1950
2 SHEETS—SHEET 1
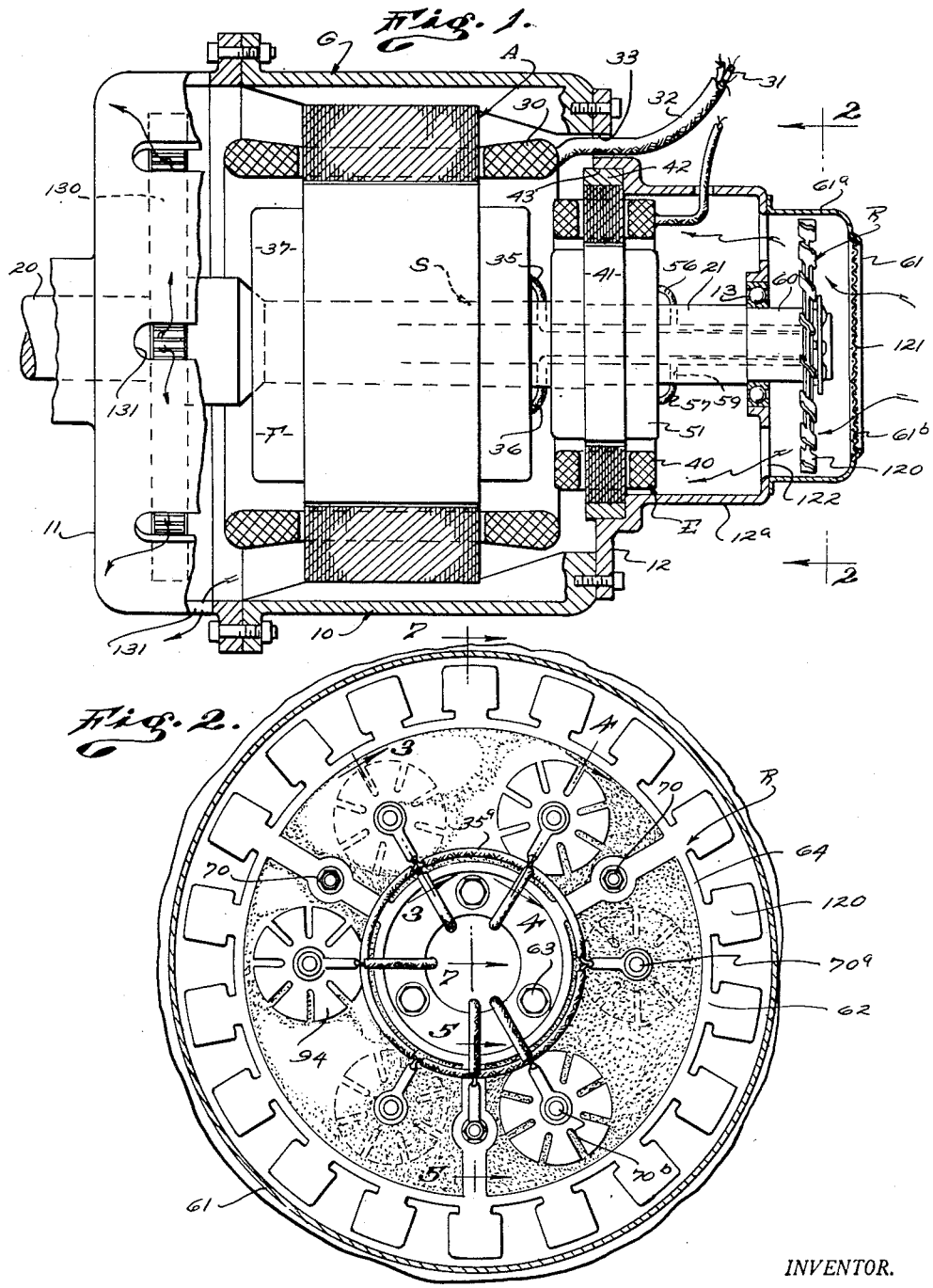
INVENTOR.
Maurice W. Brainard
BY
*W H Chapell*
Attorney

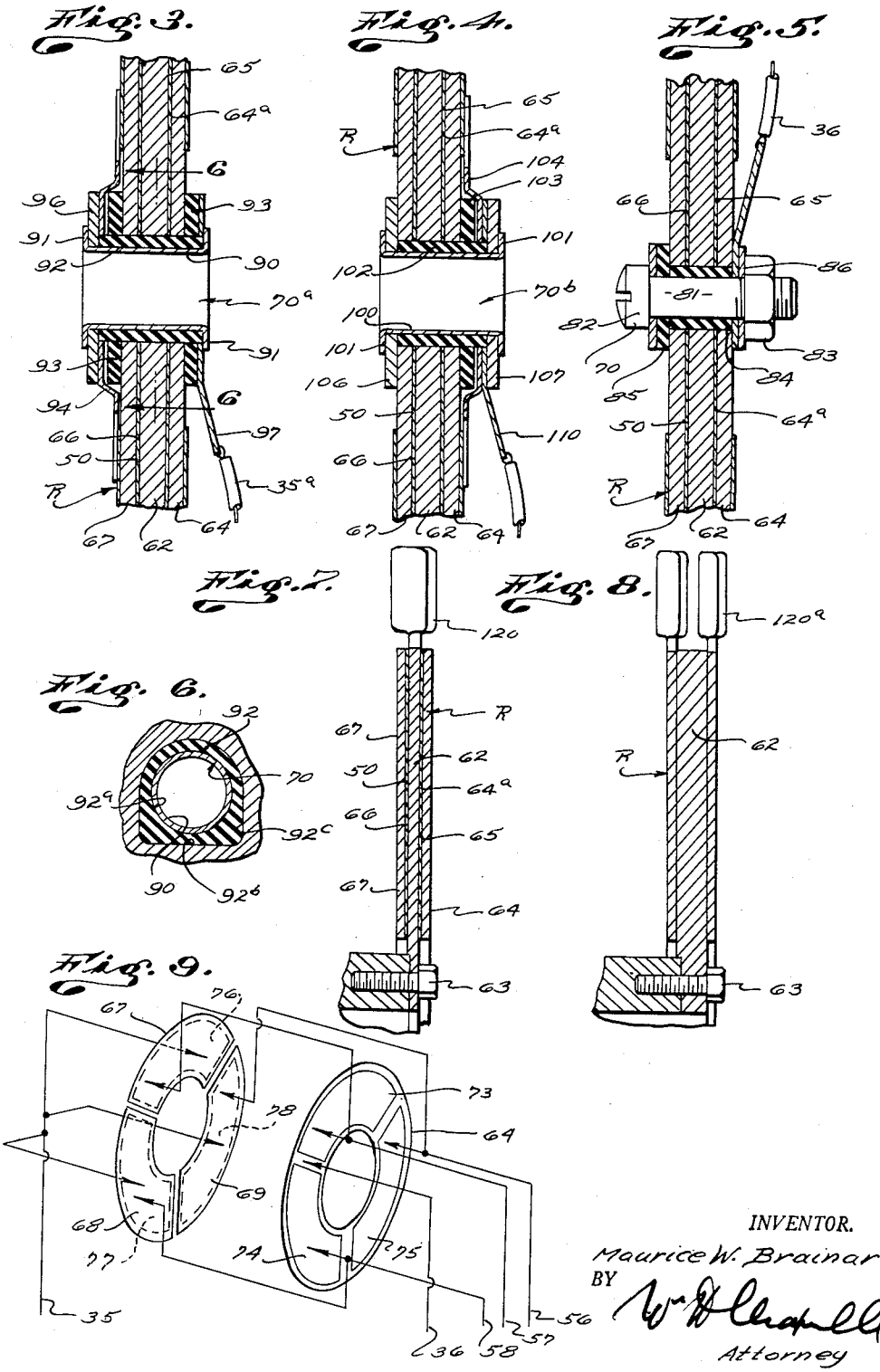

Patented Apr. 7, 1953

2,634,379

UNITED STATES PATENT OFFICE 2,634,379

ROTATING RECTIFIER FOR ELECTRIC MACHINES

Maurice W. Brainard, Los Angeles, Calif., assignor of one-half to O'Keefe & Merritt Company, Los Angeles, Calif., a corporation of California Application November 17, 1950, Serial No. 196,165

15 Claims. (Cl. 310—67)

This invention has to do with a rotating rectifier for electric machines, and it is a general object of the invention to provide a dry or plate type rectifier useful in connection with an electric generator, or the like, to be carried on and operated by the generator shaft, and which circulates a cooling medium such as air, so that it remains in proper operating condition and operates efficiently under conditions such as are commonly encountered by electrical machines of the general character referred to. The cooling effect gained by the present invention is of particular importance as it materially lengthens the life of the rectifier as a whole.

It is another object of this invention to provide an electric machine of the general character referred to in which various improved constructions and arrangements of parts are provided in the rectifier assembly with the result that the rectifier as a whole is simple and dependable in construction and is efficient and practical in use.

The construction of the present invention can be used to advantage in an electrical machine of the general character described and claimed in my copending application entitled "Electric Machines," Serial No. 158,495, filed April 27, 1950. In that machine I provide an annular stator and a revolving core operating to generate alternating current. The stator is, in effect, an armature, whereas the rotor is a field involving a plurality of field coils to be excited by direct current. The rotor has or is carried by a rotating shaft on a part of which there is provided a generator serving to generate current for exciting the field coils. This exciting generator delivers alternating current which is handled by a rectifier serving to rectify the alternating current and to deliver direct current to the field coils. The rectifier is of the dry or plate type and is carried by an extension of the rotor shaft.

The features of construction provided by the present invention are concerned with or confined to a dry or plate type rectifier such as may be employed in a machine of the general character just referred to. In accordance with the present invention the rotor shaft extension has a rectifier assembly fixed thereon to rotate therewith and the general or main case of the electric machine has a housing projecting therefrom and enclosing the rectifier. The housing extension of the main case is preferably formed by an annular or cylindrical shell that surrounds the rectifier and which projects axially outward beyond the rectifier and a flat screen at the outer end of the shell.

In accordance with the present invention the rectifier involves a flat disc or plate-like carrier fixed on the shaft extension and plates of base metal mounted on opposite sides or faces of the carrier. These plates are insulated from the carrier as by thin sheets of suitable electrical insulating material. One plate is annular in form while the other or opposite plate is segmental in form and may involve, say, three circumferentially spaced like segments or sections. The base plates are provided on their outer or exposed sides with bodies or deposits of selenium or other like material. There are three circumferentially spaced bodies of selenium on the annular base plate and there is an individual body of selenium on each segment of the segmental plate.

The invention provides fasteners connecting the assembly of parts just referred to, that is, the selenium carrying plates and the carrier. There are fasteners, preferably in the nature of bolt type fasteners, connecting the plates and carrier so that the bolts involved, which are made of metal, have contact with the annular base plate. Each of these fasteners involves a sleeve of insulating material surrounding the bolt and a washer of insulating material under the head of the bolt. An electrical connection can be made with the annular plate through a contact engaged under the nut of one of these fasteners, such nut being located to oppose the annular base plate.

A series of electrical connectors is included in the assembly to electrically connect each segment or section of the segmental base plate with each selenium body on the annular plate. Each of these connectors involves a tubular stem extending through the assembly and having flanges on its ends. An insulating sleeve surrounds the stem and an insulating washer is provided around the sleeve at the annular plate while a contact washer surrounds the sleeve at the other side of the assembly. The contact washer makes electrical contact with a section or segment of the segmental base plate. Contact discs on the stems of these connectors at the annular plate have serrated peripheries that bear upon and make electrical contact with the selenium bodies on the annular plate.

Each of the connectors just referred to has a lead line which is attached thereto. These lines come from the exciting generator.

Another series of electrical connectors is included in the construction, and involves a connector for each segment of the segmental base plate. Each of these connectors involves a tubular stem with flanges on its ends, a sleeve of insulating material around the stem and insulating washers on the sleeve at each side of the assembly. A contact disc is carried on each stem and engages and makes electrical contact with the selenium body on one of the sections of the segmental plate. A line delivering direct current to the field of the main generator has branch connections that make contact with each of the last-mentioned connectors as by engaging the stems thereof.

The invention provides for the cooling of the rectifier parts hereinabove described and in the preferred construction the housing around the rectifier is a simple cylindrical shell. The outer end of the shell is closed by a screen or wire mesh. The assembly forming the rectifier carries a plurality of vanes or blades preferably on its periphery. In one form of the invention these blades project from the periphery of the carrier and in another form they project from the outer or peripheral edge portions of one or both of the base plates.

The various objects and features of my invention will be fully understood from the following detailed description of typical preferred forms and applications of the invention, throughout which description reference is made to the accompanying drawings, in which:

Fig. 1 is a view illustrating an electrical machine embodying the present invention, the machine being in the nature of an alternating current generator with rotating field coils excited through the rectifier embodying the invention, parts of the machine being shown in section to illustrate the general arrangement of parts. Fig. 2 is an enlarged detailed transverse sectional view taken as indicated by line 2—2 on Fig. 1. Fig. 3 is an enlarged detail sectional view taken as indicated by line 3—3 on Fig. 2. Fig. 4 is an enlarged detailed sectional view taken as indicated by line 4—4 on Fig. 2. Fig. 5 is an enlarged detailed sectional view taken as indicated by line 5—5 on Fig. 2. Fig. 6 is a sectional view taken as indicated by line 6—6 on Fig. 3. Fig. 7 is an enlarged detailed sectional view taken as indicated by line 7—7 on Fig. 2. Fig. 8 is a view similar to Fig. 7 showing another form of construction, and Fig. 9 is a diagrammatic view illustrating the manner in which the elements of the rectifier may be connected electrically.

In the drawings I have illustrated a main generator G, an exciter E, supplying field current to the main generator G, and a rectifier R rectifying the current from the exciter E so that the field of the generator G is supplied with direct current. In a typical case the field of the exciter may be a compound field involving one or more permanent magnets and one or more electromagnets.

The generator G is shown as involving a case having a cylindrical body 10, an end 11 closing the inner end of the body and an end 12 closing the outer end of the body. A shaft S is rotatably supported in bearings 13 at the ends of the generator and extends centrally through the body 10. An armature assembly A is fixed in the body 10 and a field assembly F is fixed on the shaft S to operate therewith and within the armature.

The shaft S has a driven section 20 entering the case through the inner end 11 thereof and has a tubular section 21 joined or coupled to the section 20 and extending through the case 10 to carry the field F.

The armature A is shown as an assembly fixed in the body 10 and having windings 30 with lead lines 31 extending from the generator in a cable 32, passing from the case of the generator through an opening 33.

The field F of the main generator is fixed on the shaft section 21 and has field windings 37 from which lead lines 35 and 36 extend and pass through the shaft section 21 to the end thereof remote from shaft section 20.

The exciter E which is, in effect, a part of or accessory to the main generator G is preferably located within the case of the generator. The exciter is shown as involving a fixed or stationary field 40 and a rotating armature 41. The exciter is shown as a three-phase generator and is carried within the end 12 of the generator case. The field 40 is an annular assembly carried in a ring 42 mounted in a bore 43 in the end 12. The armature of the exciter E is fixed on the shaft section 21 to occur within the field 40, and the windings 51 of the exciter armature are connected with output leads 56, 57 and 58 that extend from the windings into the shaft 21 through openings 59. The leads 56, 57 and 58 extend to the rectifier R.

The rectifier R receives the alternating current output from the exciter E and rectifies it to supply direct current to the leads 35 and 36 that extend from the rectifier to the windings 37 of the field F of generator G. The rectifier is mounted on or carried by the shaft S to operate therewith or as a unit with the field F of the generator, and with the armature 41 of the exciter E.

The rectifier is a simple dry or plate-type rectifier and may be of the type commonly referred to as a "selenium rectifier." It is to be understood, however, that the term "selenium" is merely indicative of a general class of materials that may be used, for example, as equivalents I may employ copper oxide, magnesium-copper sulphide, or any semi-conductive material having a suitable rectifying characteristic when used where I specify selenium.

The particular rectifier R illustrated is such as to handle three-phase alternating current delivered by the exciter and it serves to supply or deliver direct current to the generator field. The rectifier is shown mounted on the outer end portion of the shaft S or on a shaft extension 60 projecting outward of or beyond the end 12 of the case of the generator. In the particular case illustrated the end 12 of the generator case has a portion 12ª surrounding the exciter E and supporting a bearing 13 adjacent the rectifier.

In accordance with the present invention the case of the generator is provided with an extension 61 which encloses or houses the rectifier. The extension 61 is shown as involving an annular wall or shell 61ª that surrounds the rectifier and which projects from the case part surrounding the exciter. A flat end 61ᵇ of wire mesh or screening closes the outer end of the shell and encases the otherwise exposed end of the rectifier.

The rectifier, as shown in Figs. 1 to 7 of the drawings, involves, generally, an assembly of parts or elements that are in the nature of a unit carried by or fixed upon the shaft extension 60. The rectifier is made up of or includes a carrier 62, plates of base metal on opposite sides of the carrier and insulated therefrom, bodies of selenium on the plates, fasteners 70 connecting the carrier and plates and electrical connections 70ª and 70ᵇ between certain of the parts.

The carrier, in the form of the invention under consideration, is preferably a metal plate, disc-shaped in character so that it is round and concentric with the shaft, and has flat opposite sides. Suitable fasteners such as screw fasteners 63 may be employed to couple or connect the carrier to the shaft extension 60.

A plate 64 of suitable base metal, such as aluminum, is arranged at one side, preferably the outer side 65 of the carrier, and is an annular plate arranged concentric with the shaft and parallel with the carrier. Where the carrier is formed of metal it is preferred that a film or sheet of electrical insulating material 64a be interposed between the plate 64 and the carrier so that these parts are electrically insulated from each other without being insulated against the transmission of heat. In practice a suitable paper may be used for this purpose.

A plate of base metal, like that involved in plate 64, is provided at the opposite or inner side 66 of carrier 62 and is segmental in form, preferably involving three like base segments or sections 67, 68 and 69. These base sections are preferably flat and arranged in an annular series and parallel with the inner side of the carrier. Where the carrier is of metal the plate sections are preferably insulated therefrom as by electrical insulation 50 such as I have described above.

The rectifier includes spaced bodies 73, 74 and 75 of selenium on the outer or exposed side of the annular base plate 64 and spaced bodies 76, 77 and 78 of selenium on the outer or exposed sides of the plate sections 67, 68 and 69, respectively.

In accordance with the present invention the plates or plate sections of base metal which I refer to as base plates are joined with or connected to the carrier by means of fasteners 70, and by means of the electrical connectors 70a and 70b. In the preferred arrangement there are three like fasteners 70 and they occur between the plate sections 67, 68 and 69 or where the plate sections approach each other.

Each fastener 70 is a bolt type fastener including a bolt having a shank 81, a head 82 and a nut 83 threaded on the shank. The shank extends through the assembly comprising the carrier and plates and in the preferred arrangement the head of the bolt is at the side of the carrier where the sectional plate occurs, while the nut is at the side of the carrier where the annular plate occurs. A sleeve 84 of insulating material surrounds the shank 81 and a washer 85 of insulating material occurs between the head 82 and the section of the segmental plate. A washer 86, that may be of metal, is arranged beneath the nut at the annular plate 64.

The electrical circuit of the rectifier requires that the annular plate 64 be electrically connected with the field to be supplied with direct current. For this purpose a lead line 36 may be connected to the plate 64 at one of the fasteners 70, as by being engaged under the washer 86 of that fastener, as shown in Fig. 5 of the drawings. The line 36 may extend through the shaft of the rotor to the field F of the generator.

The electrical connectors 70a provide connections between the selenium bodies on the sections of the segmental plate and the line 35 that goes to the field winding 37 of the main generator. The connectors 70a correspond in number with the sections of the segmental plate or are in multiples thereof, there being one or more connectors 70a for each section of the segmental plate.

Each connector 70a preferably involves a tubular stem 90 that extends through the assembly formed by the carrier and plates. The stem has radially projective flanges 91 on its ends. A sleeve 92 of insulating material surrounds the stem 90 and washers 93 of insulating material occur around the end portions of the stem and between the flanges and the plates at opposite sides of the assembly.

At the side of the assembly where the sections of the segmental plate occur, a disc-shaped contact 94 is carried on the sleeve 92 between washer 93 and a retainer or contact 96 held by a flange 91 on the stem. The contact 94 has a serrated peripheral edge that bears on and makes contact with the selenium body on the plate section where the connector occurs. Through this construction electrical connection is established between this selenium body and the tubular stem 90.

At the side of the assembly where the annular plate occurs, a contact 97 is carried on the end portion of the sleeve 92 and is held against the washer 93 by a flange 91. A branch 35a of line 35 connects to the contact 97. To complete the necessary electrical circuit, branches 35a from the line 35 connects to the several connectors 70a in the manner just described.

In accordance with the present invention the stem 90 is round in cross section and the insulating sleeve 92 has a bore or opening 92a that receives the stem. The exterior of the sleeve 92a is other than round in cross section, in fact, it is made key-shaped and in the particular case illustrated has a flat side 92b. The openings 92c provided through the carrier and plates to accommodate the sleeve and the openings in the contacts 94 and 97 receiving the sleeve are shaped the same as the exterior of the sleeve. Through this construction the sleeve is keyed in the assembly against rotation and the contacts 94 and 97 are keyed to the sleeve against rotation or shifting as the machine operates.

The connectors 70b correspond in number to the sections of the segmental plate, or multiples thereof, and they establish electrical connections between the sections of the segmental plate and the bodies of selenium on the annular plate so each section of the segmental plate is electrically connected with a corresponding selenium body on the annular plate. The lines carrying the three-phase circuit from the exciter connect to the connectors 70b, one to each connector.

Each electrical connector 70b, as shown in the drawings, involves a tubular stem 100 with end flanges 101. A sleeve 102 of insulating material surrounds the stem and a washer 103 of insulating material surrounds the sleeve and engages the annular plate. A contact washer 106 is held under the flange 101 at one end of the sleeve so that it maintains electrical contact with a section of the segmental plate. The other flange 101 on the stem 100 retains a contact washer 107. A disc-shaped contact 104 is carried on the sleeve 102 and makes contact with the selenium body carried on the annular plate through which the connector extends. A contact member 110 is held between the contact washer 107 and the disc contact 104 so electrical connection is established between the said selenium, the contact 110, the washer 107, stem 100 and the contact washer 106 that engages the section of the segmental plate through which the connector extends.

In accordance with the present invention the sleeve 102 is shaped the same as sleeve 92 hereinabove described, and as shown in Fig. 6, with the result that the parts engaged thereon are keyed or held against rotation about the axis of the connector. The contact 110 projects laterally from the connector just described, and one of the lines from the exciter is connected thereto.

The cooling means provided by the present invention involves vanes or blades on the assembly hereinabove described, and in the form of the invention under consideration, it involves fan blades 120 formed on and projecting radially from the periphery of the carrier 62. The blades may vary in form and extent and in typical case they may be shaped, spaced, proportioned and pitched substantially as shown in Figs. 1 and 2 of the drawings. In a preferred form of the invention the blades are integral with the carrier.

The invention further provides openings in the end 12 of generator housing that encloses the exciter. In the case illustrated, the cylindrical shell 61a is open at its outer end forming a central opening 121 which is provided with a protective wire screen 61b. The end 12 of the generator housing is provided with a plurality of circumferentially spaced openings 122 in an annular series. The openings 122 occur within the shell 61a and are in line with the flow of air from the fan blades 120. With the construction just described, rotation of the rectifier assembly that occurs when the machine is in operation results in a circulation of air through the housing 61 and into the housing of the main generator G as indicated by the arrows in Fig. 1, and as a result thereof the rectifier is kept cool and its life is materially prolonged. As shown in Fig. 1 of the drawings, the main generator G is provided with a blower fan 130 carried on the shaft S. Openings 131 are provided in the wall 10 of the housing and the air circulated through the generator by the blower 130 is exhausted through these openings.

In the form of the invention shown in Fig. 8 of the drawings, blades 120a are provided on the peripheral portions of the plate sections rather than on the carrier. However, in all other respects the construction there described may be the same as that first described.

As the rectifier operates converting alternating current to direct current, heat is generated at the plates. With the construction that I have provided and shown in Fig. 7, the heat thus generated is conducted from the plates through the thin electrical insulation beneath the plates to the carrier and part of this heat is conducted by the carrier to the blades 120 where it is dissipated. It is also to be recognized that the general circulation of air resulting from the action of the blades causes heat to be carried away throughout the entire exterior of the assembly. The fan 130 and the blades on the rectifier cooperate to circulate air completely through the housing from one end to the other so that the air enters through the screen 61a and is exhausted through openings 131. Furthermore, it is to be noted that the connectors 70a and 70b, being characterized by tubular stems, allow air to circulate through the assembly, and, as a result, effective cooling is gained at these portions of the structure.

In the form of the invention shown in Fig. 8, heat generated at the plates of the assembly is communicated directly to the blades on the plates, and, as a result, efficient cooling is gained.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A rectifier including rectifying elements combined into a disc-like assembly adapted to rotate and including a carrier, plates on the carrier and bodies of selenium on the plates, and blades on the periphery of the assembly circulating air as the assembly rotates.

2. A rectifier including rectifying elements combined into a disc-like assembly adapted to rotate and including a carrier, plates on the carrier and bodies of selenium on the plates, and blades on the carrier circulating air as the assembly rotates.

3. A rectifier including rectifying elements combined into a disc-like assembly adapted to rotate and including a carrier, plates on the carrier and bodies of selenium on the plates, and blades on a plate of the assembly circulating air as the assembly rotates.

4. A rectifier including rectifying elements combined into a solid disc-like assembly adapted to rotate and including a carrier, plates on the carrier, electrical insulation between the plates and carrier, and bodies of selenium on the plates, and blades on the assembly circulating air as the assembly rotates.

5. In combination, rectifying elements combined into a disc-like assembly adapted to rotate and including, a carrier, plates of base metal on the carrier and bodies of selenium on the plates, a housing around the assembly, and blades on the assembly and within the housing, the housing including an annular shell open at one end and surrounding the assembly and an air passing screen covering said end of the shell.

6. In combination, a generator having a housing and a rotor operating in the housing, an exciter in the housing and operating with the rotor, a rotating rectifier operating with the rotor and comprising rectifying elements combined into a disc-like assembly including, a carrier, plates of base metal on the carrier and bodies of selenium on the plates, the housing having an extension projecting from one end surrounding the assembly, and blades on the said disc-like assembly and within the housing extension, the housing extension including an annular shell surrounding the assembly and open at its terminal end and a screen covering the open end of the shell, there being an air passage through the housing from one end to the other.

7. In combination, a rotating disc-like assembly including, a carrier, plates of base metal on the carrier and bodies of selenium on the plates, a ported housing enclosing the assembly, and air handling blades on the assembly and within the housing 8 In combination, a rotating disc-like assembly including, a carrier, plates of base metal on the carrier and bodies of selenium on the plates, a ported housing enclosing the assembly, and air handling blades on the assembly and within the housing, the blades being on the periphery of the carrier.

9. In combination, a rotating disc-like assembly including, a carrier, plates of base metal on the carrier and bodies of selenium on the plates, a ported housing enclosing the assembly, and air handling blades on the assembly and within the housing, the blades being on the periphery of the plates.

10. A rectifier including, a rotating disc-like assembly including a carrier, plates on the carrier and bodies of selenium on the plates, blades on the assembly circulating air as the assembly rotates, fasteners connecting the carrier and plates, and electrical connectors extending through the assembly from one side to the other thereof.

11. A rectifier including, a rotating disc-like assembly including a carrier, plates on the carrier and bodies of selenium on the plates, blades on the assembly circulating air as the assembly rotates, fasteners connecting the carrier and plates, and tubular electrical connectors extending through the assembly from one side to the other thereof.

12. A rectifier including, a rotating disc-like assembly including a carrier, plates on the carrier and bodies of selenium on the plates, blades on the assembly circulating air as the assembly rotates, fasteners connecting the carrier and plates, and electrical connectors extending through the assembly from one side to the other thereof, the connectors including contacts at the exterior of the assembly and means keying the contacts against rotation.

13. A rectifier including, a rotating disc-like assembly including a carrier, plates on the carrier and bodies of selenium on the plates, blades on the assembly circulating air as the assembly rotates, fasteners connecting the carrier and plates, and electrical connectors extending through the assembly from one side to the other thereof, the connectors including contacts at the exterior of the assembly and insulating sleeves keyed to the assembly and holding the contacts in predetermined positions.

14. A rectifier including, a rotating disc-like assembly including a carrier, plates on the carrier and bodies of selenium on the plates, blades on the assembly circulating air as the assembly rotates, fasteners connecting the carrier and plates, and electrical connectors extending through the assembly from one side to the other thereof, the connectors including tubular stems extending through the assembly, and contacts carried by the stems at the exterior of the assembly.

15. A rectifier including, a rotating disc-like assembly including a carrier, plates on the carrier and bodies of selenium on the plates, blades on the assembly circulating air as the assembly rotates, fasteners connecting the carrier and plates, and electrical connectors extending through the assembly from one side to the other thereof, the connectors including tubular stems extending through the assembly, contacts carried by the stems at the exterior of the assembly, and insulating sleeves around the stems keyed to the assembly and holding the contacts in predetermined positions.

MAURICE W. BRAINARD.

REFERENCES CITED

The following references are of record in the file of this patent:

UNITED STATES PATENTS

| Number | Name | Date |
| --- | --- | --- |
| 2,383,669 | Moore | Aug. 28, 1945 |
| 2,395,059 | Morris | Feb. 19, 1946 |
| 2,414,287 | Crever | Jan. 14, 1947 |
| 2,433,390 | Packer | Dec. 30, 1947 |
| 2,497,141 | Schultz | Feb. 14, 1950 |

FOREIGN PATENTS

| Number | Country | Date |
| --- | --- | --- |
| 911,198 | France | Mar. 4, 1946 |